(12) United States Patent
Kagawa

(10) Patent No.: US 9,554,019 B2
(45) Date of Patent: Jan. 24, 2017

(54) IMAGE PROCESSING APPARATUS AND IMAGE PROCESSING METHOD

(75) Inventor: Hidetsugu Kagawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 12/843,475

(22) Filed: Jul. 26, 2010

(65) Prior Publication Data

US 2011/0038020 A1    Feb. 17, 2011

(30) Foreign Application Priority Data

Aug. 11, 2009 (JP) ................. 2009-186773

(51) Int. Cl.
   *H04N 1/46* (2006.01)
   *H04N 1/58* (2006.01)

(52) U.S. Cl.
   CPC ....................... *H04N 1/58* (2013.01)

(58) Field of Classification Search
   USPC .......... 358/1.1, 1.9, 500, 501, 505, 515, 518
   See application file for complete search history.

(56) References Cited

U.S. PATENT DOCUMENTS

| | | | |
|---|---|---|---|
| 5,483,359 A * | 1/1996 | Yumiba et al. | 358/513 |
| 6,198,550 B1 | 3/2001 | Toyoda | |
| 6,897,979 B1 * | 5/2005 | Mitsubori | 358/1.9 |
| 7,145,693 B2 | 12/2006 | Kagawa | |
| 7,339,703 B2 | 3/2008 | Kagawa | |
| 7,653,239 B2 | 1/2010 | Makino | |
| 2006/0023943 A1* | 2/2006 | Makino | 382/167 |
| 2008/0133607 A1* | 6/2008 | Tanaka et al. | 707/104.1 |
| 2008/0239354 A1* | 10/2008 | Usui | 358/1.9 |

FOREIGN PATENT DOCUMENTS

| | | |
|---|---|---|
| JP | 4-280575 | 10/1992 |
| JP | 09-149270 | 6/1997 |
| JP | 10215381 A * | 8/1998 |
| JP | 2004-096625 | 3/2004 |
| JP | 2006-042267 | 2/2006 |

OTHER PUBLICATIONS

Japanese Office Action dated Jun. 7, 2013, in JP 2009-186773, with English translation.

* cited by examiner

*Primary Examiner* — Thomas D Lee
(74) *Attorney, Agent, or Firm* — Fitzpatrick Cella Harper & Scinto

(57) ABSTRACT

An image processing apparatus reads an image on an original and generates lines of data by causing a carriage to perform scanning, then by referring to the data, detects chromatic color pixels that exist between two achromatic color pixels, being first and second achromatic color pixels, from among pixels in the image that has been read in the scanning direction of the carriage, and determines one of the detected chromatic color pixels as a pixel of interest and corrects the pixel of interest to an achromatic color pixel while shifting the position of the pixel of interest pixel-by-pixel N times from a pixel position adjacent to the first achromatic color pixel in a direction toward the second achromatic color pixel.

6 Claims, 5 Drawing Sheets

IMAGE PROCESSING APPARATUS AND IMAGE PROCESSING METHOD

BACKGROUND OF THE INVENTION

Field of the Invention

The present invention relates to an image processing apparatus and method for performing color-shift correction processing of image data.

Description of the Related Art

A color scanner is known as an image reading apparatus that reads an image by switching different emission wavelengths of light. Such a color scanner includes a carriage that is movable in a predetermined direction and equipped with a lighting device and an image sensor, which are line-shaped. The light source of the lighting device is LEDs that are capable of illuminating at emission wavelengths corresponding to Red (R), Green (G), and Blue (B) light. An original is read by the line-shaped image sensor receiving reflected light from the original while the carriage is moved in a direction (hereinafter referred to as a sub-scanning direction) crossing the longitudinal direction of the line-shaped lighting device. A moving reading method is used as a method for reading an original.

The moving reading method as referred to herein is a reading method in which light-source LEDs are switched while a CIS (Contact Image Sensor) unit is transported in the sub-scanning direction. Specifically, a red LED is lighted to obtain the R component of a color image, then a green LED is lighted to obtain the G component, and finally a blue LED is lighted to obtain the B component. A single line of image data is obtained in a single cycle of lighting those red, green, and blue LEDs. Accordingly, a single page of image data is obtained by repeating the lighting cycle while transporting the CIS unit in the sub-scanning direction.

However, color shifts occur with such moving reading where the RGB LEDs are lighted sequentially. Color shifts are described below with reference to the drawings. FIG. 7 illustrates how color shifts occur. A description is given of a case where an original whose color changes in the order of white, black, and white is read in the sub-scanning direction. Assume that the RGB light sources are lighted at times as shown in FIG. 7 when reading the original while transporting the CIS unit in the sub-scanning direction. When reading a region 1, the RGB read value is white (255, 255, 255) because the RGB light sources illuminate a white area of the original and the reflected light enters the sensor. Similarly, when reading a region 3, the RGB read value is black (0, 0, 0). When reading a region 2 that includes an edge where the color changes from white to black, the G light source illuminates both white and black areas of the original. In this case, the read value for G is an intermediate value of the values of white and black and accordingly the RGB read value is orange (255, 128, 0). Meanwhile, when reading a region 4 that includes an edge where the color changes from black to white, the RGB read value is blue (0, 128, 255).

As described above, in the method for sequentially activating the light sources in the order of R, G, and B, a color-shifted pixel with a warm chromatic color is generated on the upstream side, in the sub-scanning direction, of an edge where the color changes from white to black, whereas a color-shifted pixel with a cool chromatic color is generated on the downstream side of the edge. As a method for reducing such color shifts, a method is known in which a pattern is used to recognize an edge portion of white and black, and when the pattern is matched, a color-shifted pixel is replaced by black or white (Japanese Patent Laid-Open No. 4-280575). A method is also known in which a color shift is detected at an edge portion and a color-shifted pixel is corrected to an achromatic color pixel (Japanese Patent Laid-Open No. 2004-96625). Still another method is known in which a portion where luminance increases or decreases monotonously is determined to be a color-shifted pixel and the saturation of the color-shifted pixel is corrected (Japanese Patent Laid-Open No. 2006-42267).

Here, there is a phenomenon that higher reading resolution increases the number of chromatic color pixels generated due to color shifts. This is described below with reference to the drawings. FIG. 6 illustrates an edge where the color changes from white to black, as viewed through a lens. The Y axis indicates luminance value, and the X axis indicates position. As viewed through the lens, blurring occurs at an edge portion of white and black where the color gradually changes from white to black. It is well-known that such blurring is caused by aberration.

As shown in FIG. 6, a description is given of a case where a single pixel is blurred at 300 dpi. If an image is read at 300 dpi through a lens causing such blurring, a single pixel is blurred. At 600 dpi, which is double the resolution of 300 dpi, two pixels are blurred. Similarly, at 1200 dpi, which is double the resolution of 600 dpi, four pixels are blurred. In this way, higher reading resolution increases the number of blurred pixels to be generated. Additionally, as described above, chromatic color pixels are generated at edge portions due to the phenomenon caused by color shifts. In other words, it can be seen that higher resolution widens the range of chromatic color pixels occupying an edge portion.

Similarly to the example of resolution, the range occupied by chromatic color pixels due to color shifts can also be widened depending on the type of originals. For example, printed matter printed by an inkjet printer lacks sharpness of edges. There are various causes of this, and with reference to FIG. 5, the influence of the circular shape of main droplets 501 and the influence of satellites 502 (separate ink droplets) as sub-droplets and splashes 503 (ink splashing) are known, for example. That is, blurring occurs during reading because an original edge portion is not in the form of a straight line due to the main droplets 501. Additionally, the satellites 502 and the splashes 503 form small dots away from an edge, which widens the range of blurring to be read.

As described above, originals printed by an inkjet system have a tendency to have more blurred edges than those printed by offset printing or silver halide-based photography. Such an expanded range of edge blurring also results in the expansion of the range of chromatic color pixels due to color shifts.

If the range of chromatic color pixels expands at an edge portion, color shift correction of a single pixel is not enough for correction. Also, in the case of color shift correction based on pattern recognition, enormous amounts of memory are consumed because of the expansion of the range of memory that needs to be registered as patterns.

SUMMARY OF THE INVENTION

An aspect of the present invention is to eliminate the above-mentioned problems with the conventional technology.

The present invention provides an image processing apparatus and an image processing method that enable color shift correction without complicating processing even if the range of color-shifted pixels expands.

The present invention in its first aspect provides an image processing method performed by an image processing apparatus comprising a reading unit that reads an image on an original by causing a carriage, the carriage including RGB light sources that illuminate the original in a line and a line image sensor, to perform scanning in a direction orthogonal to the line while cyclically switching the RGB light sources. The method comprises a generation step of reading an image on an original and generating lines of data by causing the carriage to perform scanning, a detection step of, by referring to the data, detecting chromatic color pixels that exist between two achromatic color pixels, being first and second achromatic color pixels, from among pixels in the image that has been read in the scanning direction of the carriage, and a correction step of determining one of the detected chromatic color pixels as a pixel of interest and correcting the pixel of interest to an achromatic color pixel while shifting the position of the pixel of interest pixel-by-pixel N times (where N is an integer higher than or equal to zero) from a pixel position adjacent to the first achromatic color pixel in a direction toward the second achromatic color pixel.

The present invention in its second aspect provides an image processing apparatus comprising a reading unit that reads an image on an original by causing a carriage, the carriage including RGB light sources that illuminate the original in a line and a line image sensor, to perform scanning in a direction orthogonal to the line while cyclically switching the RGB light sources. The apparatus comprises a generation unit configured to read an image on an original and generates lines of data by causing the carriage to perform scanning, a detection unit configured to detect, by referring to the data, chromatic color pixels that exist between two achromatic color pixels, being first and second achromatic color pixels, from among pixels in the image that has been read in the scanning direction of the carriage, and a correction unit configured to determine one of the detected chromatic color pixels as a pixel of interest and correct the pixel of interest to an achromatic color pixel while shifting the position of the pixel of interest pixel-by-pixel N times from a pixel position adjacent to the first achromatic color pixel in a direction toward the second achromatic color pixel.

The present invention thus enables color shift correction without complicating processing even if the range of color-shifted pixels expands.

Further features of the present invention will become apparent from the following description of exemplary embodiments with reference to the attached drawings.

DESCRIPTION OF THE EMBODIMENTS

First Embodiment

Figure 1:
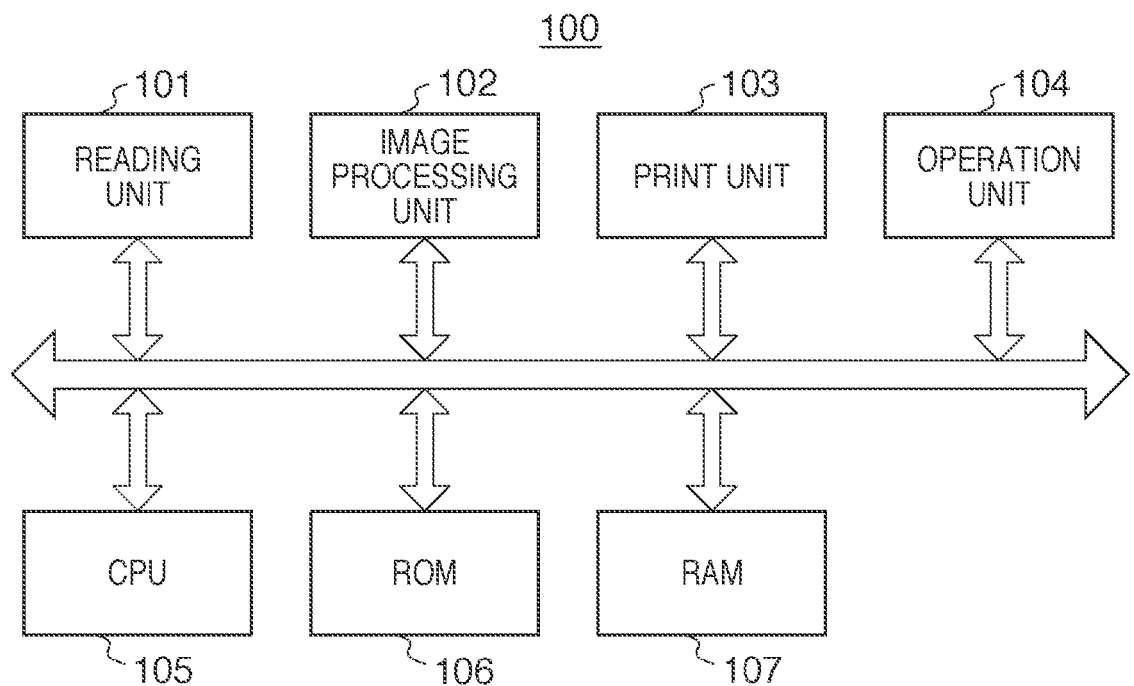
FIG. 1 is a block diagram showing a configuration of an image processing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same components are denoted by the same reference numerals or characters, and the description thereof has been omitted.

FIG. 1 is a block diagram showing a configuration of a multifunctional printer apparatus (hereinafter referred to as an image processing apparatus 100), which is a typical embodiment of the present invention. A CPU 105 is a control unit that controls the entire image processing apparatus through a system bus. A ROM 106 stores, for example, program codes used to operate the CPU 105, initial-value data, and table data used in an image processing unit 102.

A reading unit 101 converts an image that is optically read at a predetermined resolution into an electrical analog signal and then performs AD conversion of the analog signal into a digital signal. The reading unit 101 as referred to herein is, for example, a color scanner that scans an image while switching different emission wavelengths of light. In the scanner, a lighting device and an image sensor, which are line-shaped, are mounted on a carriage that is movable in a predetermined direction. LEDs that are capable of illuminating at emission wavelengths corresponding to red (R), green (G), and blue (B) light are used as light sources (RGB light sources). An original is read by the line-shaped image sensor receiving reflected light from an original while the carriage is moved in a direction (sub-scanning direction) crossing the longitudinal direction of the line-shaped lighting device. As a method for reading an original, a reading method is used in which light source LEDs are cyclically switched while a CIS unit is transported in the sub-scanning direction. A red LED is lighted to obtain the R component of a color image, a green LED is lighted to obtain the G component, and finally a blue LED is lighted to obtain the B component. A single line of image data is generated in a single cycle of lighting of those red, green, and blue LEDs. Then, a single page of image data is obtained by repeating the lighting cycle while transporting the CIS unit. In the present embodiment, a monochrome image printed on a recording medium is read with such a color scanner.

The image processing unit 102 performs image processing such as filtering on a digital signal read by the reading unit 101. A RAM 107 is used as an image buffer and an image memory, and more specifically, is used as a work memory for temporarily storing digital data read by the reading unit 101 and performing image processing in the image processing unit 102.

A print unit 103 prints a digital signal on a recording medium and uses a recording method such as an inkjet method. An operation unit 104 includes a display unit that displays various messages such as for set-up, registration, confirmation, and error notification. The operation unit 104 is also provided with keys such as a mode key used to select operation modes such as scan and copy, a setup key used to select quality and density during copying, a color start key that works in color mode according to the selected mode, and a monochrome key that works in monochrome mode according to the selected mode.

The image processing apparatus 100 has a print function, a scan function, and a copy function. The print function is a function of causing the print unit 103 to perform printing based on image data received from a connected host (not shown). The scan function is a function of converting an original image read by the reading unit 101 into digital data and transmitting the digital data to a host. The copy function is a function of causing the image processing unit 102 to perform image processing on an image read by the reading unit 101 and causing the print unit 103 to perform printing.

Following is a description of copy operation. A user makes various settings for copying based on information displayed on the display unit of the operation unit 104. The user selects a copy mode by pressing the mode key, sets copy quality and recording density by pressing the setting key, and then starts color copy operation by pressing the color start key. When the color copy operation is started, the reading unit 101 including the contact image sensor (CIS) unit reads an original image and outputs analog luminance signals of red (R), green (G), and blue (B). The analog luminance signals are converted into digital signals by an AD conversion unit and transmitted to the image processing unit 102 through the bus.

The image processing unit 102 performs image processing such as shading compensation for correcting light source unevenness and sensor sensitivity variations, image area separation processing for separating character areas from image areas, filtering processing for adopting an edge-enhancing filter according to results of the image area separation processing, and color conversion processing for performing conversion into optimum coloration. Image data that has undergone image processing is transmitted to the print unit 103. The print unit 103 performs color separation processing in which RGB data is converted into CMYK, that is, ink colors for recording. The color-separated CMYK data is converted through error diffusion processing into binary data indicating whether or not an ink droplet is applied. Based on the binary data obtained by the conversion, ink droplets are applied to paper so as to form a copy image.

Figure 2:
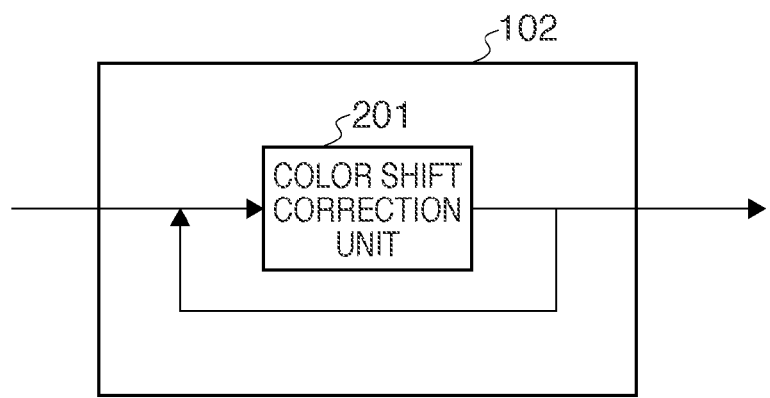
FIG. 2 illustrates a color shift correction unit.

Following is a description of color shift correction using the image processing apparatus according to the first embodiment. FIG. 2 illustrates a color shift correction unit. RGB multi-level image data that has been input in the image processing unit 102 is input into the color shift correction unit 201. As the RGB multi-level image data, outputs from the same pixels on the CIS line sensor are sequentially input into the color shift correction unit 201, corresponding to the sub-scanning direction of the original. The color shift correction unit 201 outputs corrected RGB multi-level image data. The color shift correction unit 201 is configured to loop the output data back to the input, and is thus capable of performing the same color shift correction N times (where N is an integer higher than or equal to zero). Assume, for example, that a single color-shifted pixel is generated at 300 dpi reading resolution, and two color-shifted pixels are generated at 600 dpi. The user sets the reading resolution for copying from the operation unit 104 when setting up the copy operation.

In a case where the reading resolution set by the user is 300 dpi, the number of times that the loop of the color shift correction unit 201 is repeated is zero, so color shift correction processing is performed once on the read image. In a case where the reading resolution set by the user is 600 dpi, the number of times that the loop of the color shift correction unit 201 is repeated is one, so color shift correction processing is performed twice on the read image.

Figure 8:
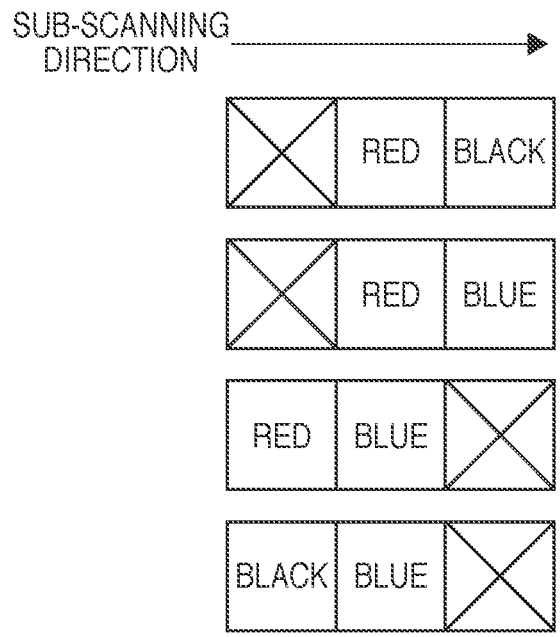
FIG. 8 illustrates color-shifted patterns.
Figure 9:
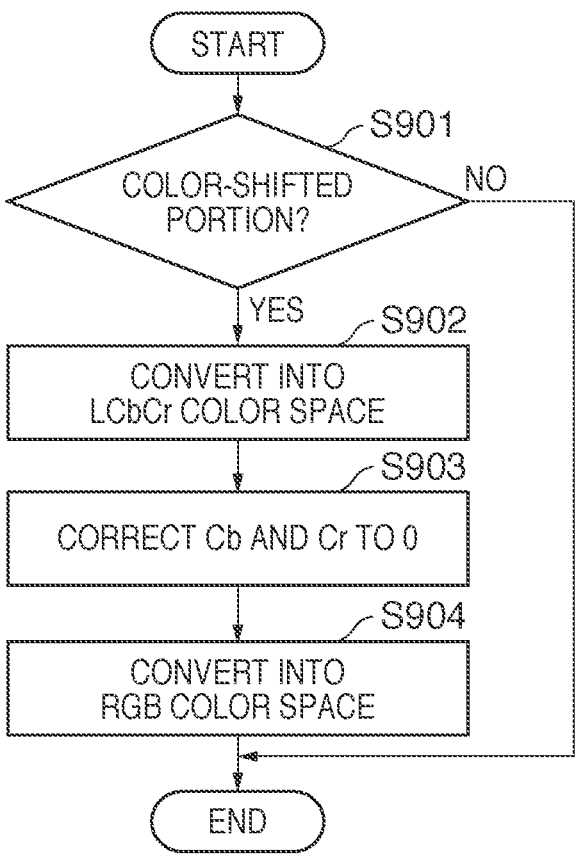
FIG. 9 is a flowchart showing a procedure of color shift correction processing.

The color shift correction is described with reference to the flowchart of FIG. 9. In step S901, it is determined whether or not a pixel of interest is a color-shifted portion. The present embodiment employs color shift correction based on pattern recognition. FIG. 8 illustrates color-shifted patterns. The CIS unit scans an original while switching the LED light sources in the order of R, G, and then B. Reading an original while switching the light sources in the order as described results in the generation of color-shifted pixels with warm colors on the upstream side of an edge of black and color-shifted pixels with cool colors on the downstream side of the edge of black. Also, in the case of reading a thin line, the line itself is blurred and constituted by only color-shifted pixels. For example, warm color pixels are on the upstream side and cool color pixels are on the downstream side. In this way, a color-shifted portion can be detected by recognizing color-shifted patterns as shown in FIG. 8 based on the principle of reading by the CIS unit. Note that pixels indicated by X's in FIG. 8 are not referred to. If it is determined in step S901 that the pixel of interest is not a color-shifted portion (NO in S901), the process ends without any correction.

In FIG. 8, the following method is used to determine the color of each pixel (red, blue, or black). If the RGB values of a pixel satisfy the relation R>G>B, the pixel is determined as red, and if the RGB values of a pixel satisfy the relation R<G<B, the pixel is determined as blue. Also, if the RGB values of a pixel are all low (R, G, B≤luminance threshold value for black) and the RGB components have small differences (|R−G|, |G−B|, |B−R|≤saturation threshold value for black), the pixel is determined as black. For example, the luminance threshold value for black is 160, and the saturation threshold value for black is 20.

A color difference of the pixel that has been determined as a color-shifted portion by pattern recognition is corrected in LCbCr color space. In step S902, RGB luminance data is converted into luminance information L and two pieces of color-difference information Cb and Cr from Equations (1), (2), and (3) below:

$$L=0.3R+0.6G+0.1B \quad (1)$$

$$Cb=B-L \quad (2)$$

$$Cr=R-L \quad (3)$$

Subsequently, the color difference component values Cb and Cr for the pixel that has been determined as a color-shifted portion are replaced by zero in step S903. Setting the color difference components to zero changes the color of the pixel to gray. In step S904, the LCbCr data is inversely converted into original RGB data, using Equations (4), (5), and (6) below:

$$R=Cr+L \quad (4)$$

$$G=(L-0.3R-0.1B)/0.6 \quad (5)$$

$$B=Cb+L \quad (6)$$

Figure 3:
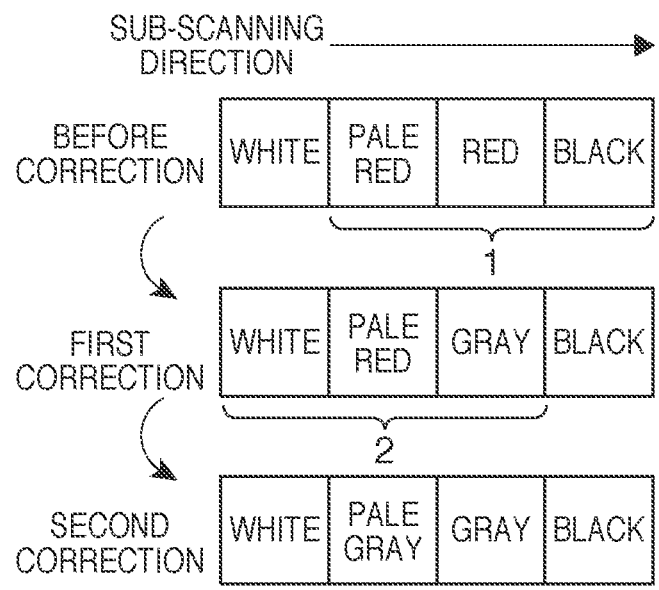
FIG. 3 illustrates how two color-shifted pixels are corrected.

Following is a description of color shift correction of two pixels. FIG. 3 illustrates how two color-shifted pixels are corrected. Before correction, two color-shifted pixels, namely a red color pixel and a pale red color pixel, exist between achromatic (white and black) color pixels. In the first color shift correction, a region (1) in FIG. 3 is determined as a color-shifted portion by pattern recognition. Thus, the Cb and Cr values for the red color pixel, which has been determined as a color-shifted portion, are corrected to zero and accordingly the red color pixel becomes a gray color pixel. In the second color shift correction, a region (2) in FIG. 3 is recognized as a color-shifted portion. Thus, the Cb and Cr values for the pale red color pixel, which has been recognized as a color-shifted portion, are corrected to zero and accordingly the pale red color pixel becomes a pale gray color pixel. In this way, one of the chromatic color pixels between the achromatic (white and black) color pixels is focused on and corrected so as to reduce the saturation of the pixel of interest, and thereafter the position of a pixel of interest is shifted sequentially (loop processing) to perform correction processing.

As described above, in the present embodiment the user explicitly specifies the reading resolution. However, the present invention is also applicable to a configuration in which there is correspondence between copy quality and reading resolution, and reading resolution is indirectly changed by the user specifying copy quality.

Second Embodiment

In the first embodiment, an example was described where the number of times N that the loop of the color shift correction unit 201 is repeated varies with reading resolution. In a second embodiment, the number of times N that the loop is repeated varies with the type of originals to be read. In the present embodiment, in the image processing apparatus 100, a table indicating correspondence between the type of originals and the number of times N that the loop is repeated is stored in advance in the ROM 106 or the like, for example.

The user sets the type of originals for copying from the operation unit 104 when setting up copy operation. Here, for example if the type set by the user is a silver halide-based original, the image processing apparatus 100 refers to the table and causes the color shift correction unit 201 to repeat the loop zero times so that color shift correction processing is performed once on the read image. If the type of originals set by the user is an inkjet original, the image processing apparatus 100 refers to the table and causes the color shift correction unit 201 to repeat the loop one time so that color shift correction processing is performed twice on the read image.

Third Embodiment

Figure 4:
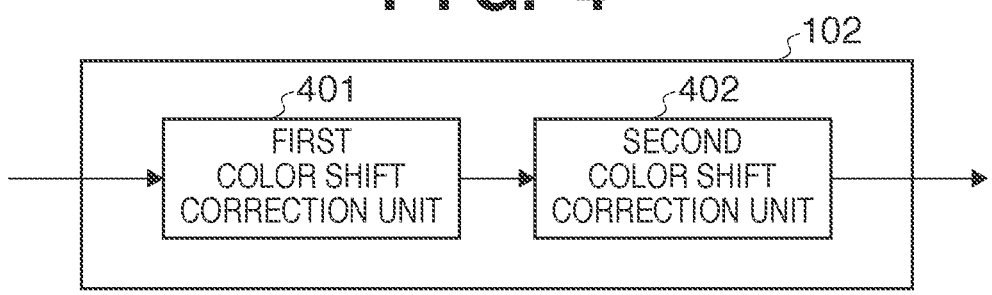
FIG. 4 shows another configuration example of the color shift correction unit.
Figure 5:
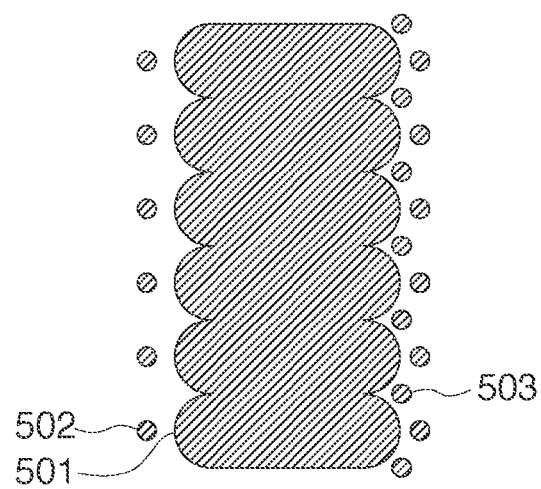
FIG. 5 illustrates an edge of printed matter printed by an inkjet printer.
Figure 6:
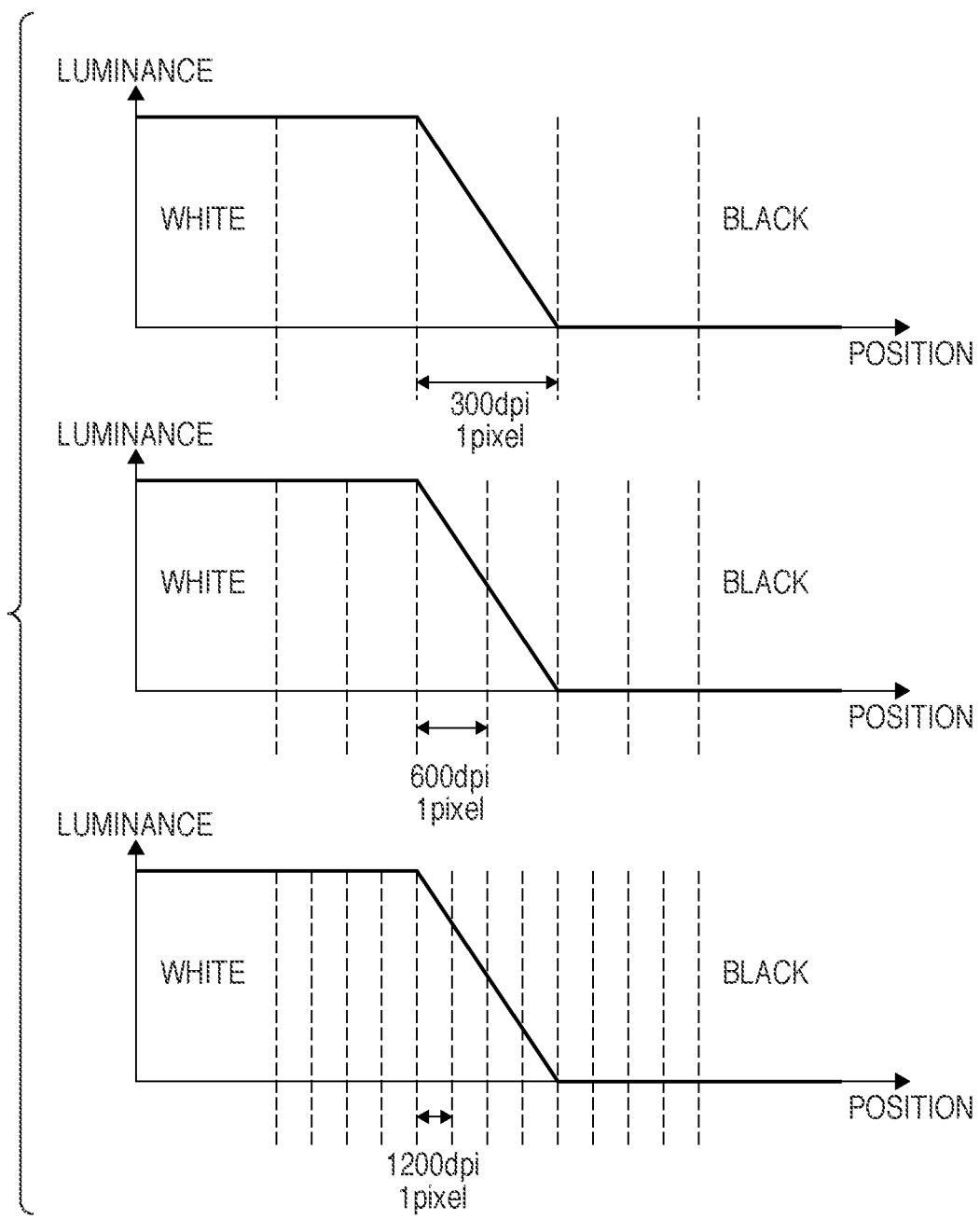
FIG. 6 illustrates specific details of an edge where the color changes from white to black.
Figure 7:
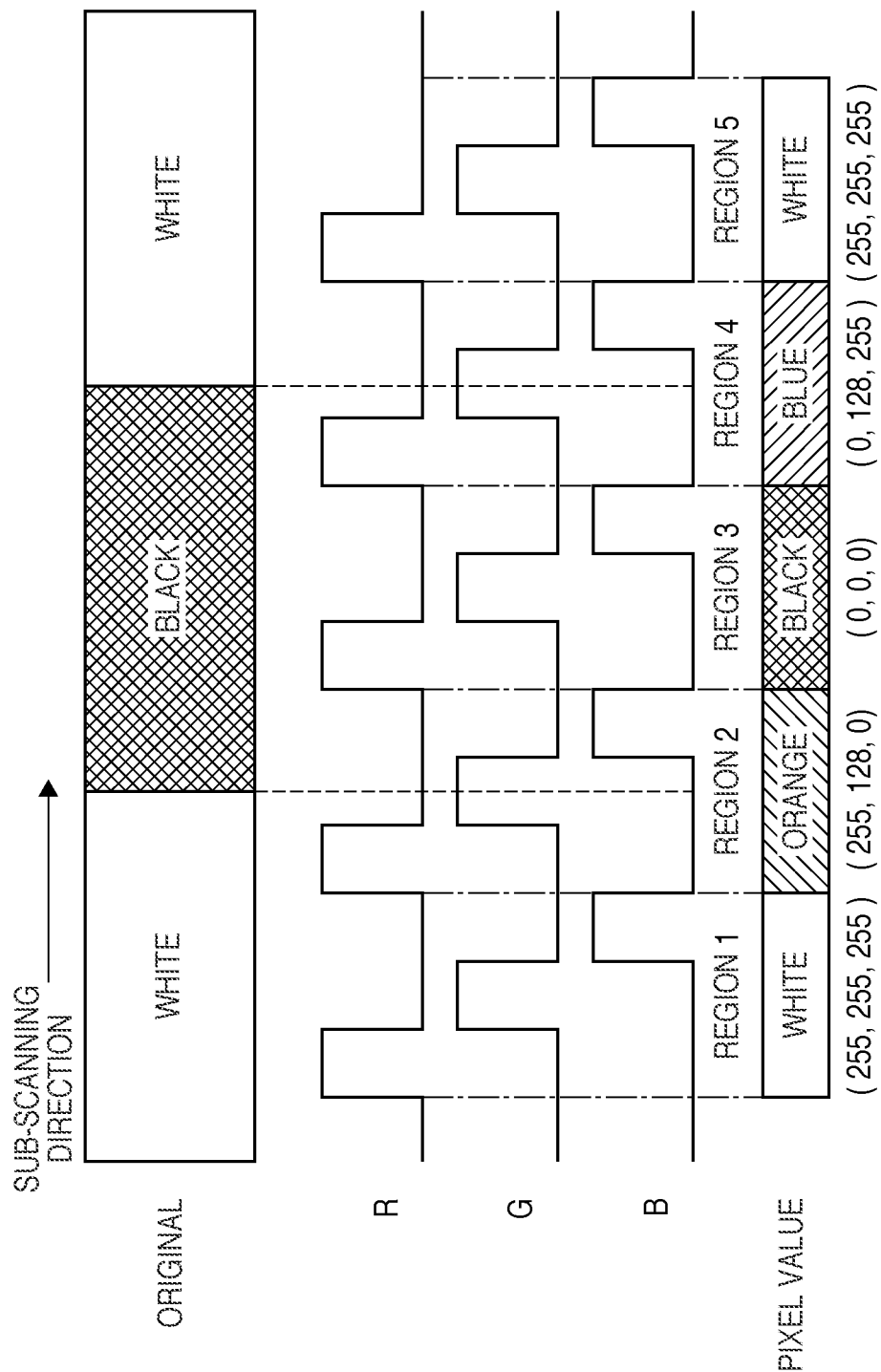
FIG. 7 illustrates how color shifts occur.

A description is given of color shift correction according to a third embodiment. FIG. 4 illustrates a color shift correction unit according to the third embodiment. Image data that has been input in the image processing unit 102 is input into a first color shift correction unit 401. Subsequent to the first color shift correction unit 401, a second color shift correction unit 402 is provided that has the same circuit configuration as the first color shift correction unit 401. That is, performing the same color shift correction processing in two steps produces comparable results to those obtained by performing color shift correction twice as in the first embodiment.

In the embodiments of the present invention, while color shift correction is performed by the color shift correction unit(s) mounted on the image processing apparatus, color shift correction may of course also be performed through computation processing by the CPU of the image processing apparatus. Moreover, in the embodiments of the present invention, while color shift correction is performed by the image processing apparatus, similar effects can of course also be achieved if color shift correction is performed through software processing by an external information processing apparatus.

As described above, in the embodiments of the present invention, even if multiple pixels are color shifted in the case of higher reading resolution or in the case of reading an original with a tendency to have blurred edges, color shifts can be corrected by performing color shift correction the same number of times as the number of color-shifted pixels. This eliminates the need to develop a new circuit for correcting a wide range of color shifts. Additionally, the amount of buffer used can be reduced because correction is performed pixel-by-pixel in looping and accordingly it is unnecessary to look at all of a wide-range area at once.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-186773, filed Aug. 11, 2009, which is hereby incorporated by reference herein in its entirety.

What is claimed is:

1. An image processing method of processing read image data obtained by reading an image on an original by using a line image sensor and scanning with RGB light sources switching sequentially, the method comprising:
    specifying a reading setting for obtaining the read image data; and
    correcting, by using at least one correction unit for correcting one chromatic color pixel to one achromatic color pixel, a plurality of chromatic color pixels which are included in the read image data obtained by reading the image on the original by the line image sensor in accordance with the specified reading setting and which exist between a white pixel and a black pixel in a scanning direction of the line image sensor to a plurality of achromatic color pixels,
    wherein correcting the chromatic color pixels is performed by using a plurality of correcting units in accordance with a number of the chromatic color pixels which are to be corrected.

2. The image processing method according to claim 1, wherein the specified reading setting includes a reading resolution, and wherein a number of the chromatic color pixels which are to be corrected increases as the reading resolution becomes higher.

3. The image processing method according to claim 1, wherein a number of chromatic color pixels which are to be corrected differs depending on a type of the original.

4. The method according to claim 1, wherein the one or more chromatic color pixels are corrected in a case where a copy mode is specified.

5. The method according to claim 1, wherein the method is performed by an image processing apparatus having a print unit, and wherein correcting the one or more chromatic color pixels is performed in the image processing apparatus.

6. A non-transitory computer-readable storage medium storing a computer-executable program for causing an image processing apparatus to perform an image processing method for processing read image data obtained by reading an image on an original by using a line image sensor and scanning with RGB light sources switching sequentially, the method comprising:

specifying a reading setting for obtaining the read image data; and correcting, by using at least one correction unit for correcting one chromatic color pixel to one achromatic color pixel, a plurality of chromatic color pixels which are included in the read image data obtained by reading the image on the original by the line image sensor in accordance with the specified reading setting and which exist between a white pixel and a black pixel in a scanning direction of the line image sensor to a plurality of achromatic color pixels, wherein correcting the chromatic color pixels is performed by using a plurality of correcting units in accordance with a number of the chromatic color pixels which are to be corrected.

* * * * *